Patented Feb. 16, 1937

2,071,287

UNITED STATES PATENT OFFICE 2,071,287

ARALKYL ETHERS OF CELLULOSE AND METHOD OF PRODUCING

Eugene J. Lorand, Wilmington, Del., assignor to Hercules Powder Company, Wilmington, Del., a corporation of Delaware No Drawing. Application November 1, 1934, Serial No. 751,086

4 Claims. (Cl. 260—152)

This invention relates to aralkyl ethers of cellulose, as, for example, benzyl cellulose, phenylethyl cellulose, etc., and more particularly to aralkyl ethers of cellulose which contain relatively few aralkyl groups and yet are uniformly aralkylated and completely soluble. This invention also relates to methods for the production of such aralkyl ethers of cellulose.

Heretofore, aralkyl ethers of cellulose, as, for example, benzyl cellulose, have been produced in the form of a product having satisfactory uniformity and solubility only when containing an average of two or more aralkyl groups per $C_6$ unit of the cellulose molecule. Aralkyl ethers of cellulose containing an average of less than two aralkyl groups per $C_6$ unit of cellulose molecule have indeed been produced, but only as the result of undesired interruptions in the aralkylation procedure resulting in an incomplete reaction. Such products, however, are decidedly non-uniform in nature, comprising unreacted cellulose and aralkyl ethers of cellulose of varying degrees of substitution. They are insoluble or only partially soluble in organic solvents and are accordingly of no technical value whatever.

It has been found in accordance with this invention that aralkyl ethers of cellulose can be produced which have an aralkyl content of less than two groups per $C_6$ unit of cellulose and which are homogenous, uniform and completely soluble. These aralkyl ethers produced in accordance with this invention are moreover superior to aralkyl ethers of higher degrees of substitution in softening only at higher temperatures than do the latter and in possessing stronger mechanical properties. These superiorities make the product in accordance with this invention of especial value for the formulation of artificial silk, cable insulation, etc.

The procedure in accordance with this invention involves broadly the reaction of alkali cellulose, prepared in any known manner, with an aralkylating agent, as, for example, benzyl chloride, phenylethyl chloride, etc., at a controlled relatively low alkali concentration for sufficient time to produce a completely soluble product.

It is known, German Patent No. 555,930, to react alkali cellulose and an aralkylating agent at a constant relatively low alkali concentration, but the product produced in accordance with that patent is not completely soluble, due to failure to cause the reaction to proceed sufficiently far. It has been believed by the prior art that causing the reaction to proceed for more than about five hours, as exemplified in the German patent referred to, will inevitably produce a cellulose ether having two or more aralkyl groups per $C_6$ unit of cellulose. It has been found, however, in accordance with this invention that the alkali concentration is the controlling factor in the production of low substituted cellulose ethers, and that if the alkali concentration is kept sufficiently low the reaction may be prolonged indefinitely without increasing the degree of substitution. The duration of the reaction only affects the homogeneity and uniformity of the product, and must be sufficient to produce a completely soluble product.

The method in accordance with my invention contemplates a reaction between an aralkylating agent and an intimate mixture of cellulose and aqueous alkali solution (alkali cellulose) effected by any of the procedures known to the art. The details of these various procedures and the amounts of reactants employed are well known to the art and need not be set out here. The concentration of alkali, referred to the aqueous phase, must, however, in accordance with this invention, be kept lower than about 28% during the entire course of the reaction. Concentrations lower than about 22% require an excessively long period of reaction, and accordingly a concentration of from about 22% to about 28% is preferred. It is also essential, in accordance with this invention, that the reaction be carried out for a greater period of time than is customarily the case that is, for a period of from 8 to 20 hours, depending upon the particular alkali concentration employed. The termination of the reaction is indicated by a complete absence of fibers in the reaction mass upon microscopic inspection.

Since the method in accordance with this invention requires an alkali concentration throughout the entire reaction of less than about 28%, it is apparent that sufficient alkali cannot be added at the start of the reaction to last throughout the reaction. The alkali concentration is accordingly kept at a figure sufficient to insure reaction but below about 28% by the repeated addition of fresh amounts of alkali during the reaction or by the removal of water during the reaction or both. These operations are known to the art and do not require any detailed description. Periodic analyses of the reaction mixture will insure that the addition of alkali or removal of water is effected at the proper rate to maintain the alkali concentration within the desired limits. When it is stated that the alkali concentration should not be greater than about 28% throughout the reaction, it is meant that concentrations in excess of this figure should not be permitted to exist for any appreciable time. Of course, momentary increases of alkali concentration beyond this value can be tolerated without danger.

The following examples are illustrative of practical procedure in accordance with this invention. One involves the so-called distillation method, and one the more ordinary and simple method without distillation.

*Example I.*—25 g. of cotton linters are immersed in 400 g. of 25% sodium hydroxide solution. After a few hours, the excess caustic solution is removed by draining and subsequent pressing, so that the alkali cellulose obtained weighs about 90–100 g. To this, 200 g. benzyl chloride are added and the whole is heated under reflux for one hour. Mild agitation of the mixture is advantageous but not essential. Then the temperature is lowered to about 100° C. and 6–8 g. solid sodium hydroxide are added with slow agitation. The addition of solid caustic soda is repeated at regular intervals, say every half hour, while the temperature is maintained at 100–105° C., and continuous agitation is applied. From time to time, the alkali content of the batch is determined and related to the water present. If the alkali concentration is found higher than 25–27%, the amounts or the frequency of the alkali additions are reduced, while the opposite is done in case the alkali concentration is too low. The treatment is continued with more and more vigorous agitation, until a uniform dope free from fibers results. By way of illustration, the actual amounts of caustic added in a particular case are given below:

| Time from beginning of benzylation | | Amount of caustic |
|---|---|---|
| Hours | Minutes | Grams |
| 1 | 00 | 8 |
| 1 | 30 | 6 |
| 2 | 00 | 4 |
| 2 | 30 | 4 |
| 3 | 00 | 3 |
| 3 | 30 | 3 |
| 4 | 15 | 3 |
| 4 | 45 | 3 |
| 5 | 30 | 3 |
| 6 | 15 | 3 |
| 7 | 00 | 3 |
| 8 | 00 | 3 |
| 8 | 45 | 3 |
| 9 | 45 | 3 |

After a total of 11 hours' treatment, all the cellulose fibers were dispersed and a very viscous dope was obtained.

After cooling, the benzyl cellulose is precipitated out according to some known method, e. g., with isopropyl ether (see my co-pending application Serial No. 747,209, filed October 6, 1934). The precipitate is washed with isopropyl ether, then with methanol.

*Example II.*—25 g. linters are soaked with 300 g. 22% caustic soda solution and, after a few hours, pressed to a total weight of 80–100 g. This alkali cellulose is placed in a suitable reaction vessel equipped with agitator and connected with a condenser for distillation. After the addition of 200 g. benzyl chloride, the reaction mixture is heated to boiling temperature (about 108–110° C.), when a constant boiling mixture of water and benzyl chloride distills over and is condensed. Care must be taken that the removal of the water from the batch should not be too fast lest the alkali concentration rise higher than desired. After more than half of the water originally present in the alkali cellulose has distilled over, about 50 g. of a 25% caustic soda solution is added to the batch and the distillation is resumed. It may be necessary to repeat this several times before the fibers are sufficiently benzylated to disperse (dissolve) completely in the reaction medium.

By way of illustration, the amounts of caustic solutions added in a particular case are shown below:

| Time from beginning of benzylation | | Caustic soda concentration | Solution added—amount |
|---|---|---|---|
| Hr. | Min. | Percent | Gram |
| 1 | 45 | 25 | 50 |
| 3 | 45 | 25 | 50 |
| 5 | 45 | 27 | 50 |
| 8 | 00 | 27 | 50 |

After a total of 10 hours' treatment, the cellulose fibers were completely dispersed and a very viscous dope resulted. As part of the benzyl chloride distills over with the water, it is necessary to replace or return this portion, either from time to time or continuously, to the reaction mixture. The separation and purification of the product may be effected in the same way as in the previous example, or according to any other method known in the art.

The aralkyl ether produced by the method in accordance with this invention will be found to be completely soluble in the usual organic solvents for such products, and will have a uniform degree of aralkylation of less than 2 aralkyl groups per $C_6$ unit of cellulose. It will consequently soften only at a relatively high temperature and will possess excellent mechanical properties. It is suitable for use in the production of films, filaments (artificial silk), plastics, and other like products.

It will be understood that the details and examples hereinbefore set forth are illustrative only, and that the invention as herein broadly described and claimed is in no way limited thereby.

What I claim and desire to protect by Letters Patent is:

1. The method of producing a low substituted aralkyl ether of cellulose which includes reacting alkali cellulose and an aralkylating agent until fibers present in the reaction mass have been completely dispersed while maintaining an alkali concentration of from about 22% to about 28% throughout substantially the entire reaction.

2. The method of producing a low substituted aralkyl ether of cellulose which includes reacting alkali cellulose and an aralkylating agent for from 8 to about 20 hours while maintaining an alkali concentration of from about 22% to about 28% throughout substantially the entire reaction.

3. The method of producing a low substituted benzyl cellulose which includes reacting alkali cellulose and benzyl chloride until fibers present in the reaction mass have been completely dispersed while maintaining an alkali concentration of from about 22% to about 28% throughout substantially the entire reaction.

4. The method of producing a low substituted benzyl cellulose which includes reacting alkali cellulose and benzyl chloride for from about 8 to about 20 hours while maintaining an alkali concentration of from about 22% to about 28% throughout substantially the entire reaction.

EUGENE J. LORAND.